United States Patent [19]

Zucker et al.

[11] Patent Number: 4,792,202
[45] Date of Patent: Dec. 20, 1988

[54] BUS OPTICAL FIBER INCLUDING LOW MODE VOLUME LIGHT SOURCE OPTIMALLY ALIGNED

[75] Inventors: Joseph Zucker, Foster City; Frank H. Levinson, Redwood City; Ralh A. Narciso, La Honda, all of Calif.

[73] Assignee: Raychem Corp., Menlo Park, Calif.

[21] Appl. No.: 79,546

[22] Filed: Jul. 29, 1987

[51] Int. Cl.[4] .......................... G02B 6/26; G02B 6/28; G02B 6/02; G02F 6/10
[52] U.S. Cl. ............................ 350/96.16; 350/96.15; 350/96.29; 455/610
[58] Field of Search .............. 350/96.15, 96.16, 96.29, 350/96.30; 455/610, 612

[56] References Cited

U.S. PATENT DOCUMENTS

| | | | |
|---|---|---|---|
| 4,270,839 | 5/1981 | Cross | 350/96.15 |
| 4,307,933 | 12/1981 | Palmer et al. | 350/96.16 |
| 4,317,614 | 3/1982 | Palmer | 350/96.16 |
| 4,557,550 | 12/1985 | Beals et al. | 350/96.16 X |
| 4,586,783 | 5/1986 | Campbell et al. | 350/96.15 |
| 4,741,585 | 5/1988 | Uken | 350/96.15 |

Primary Examiner—William L. Sikes
Assistant Examiner—Akm E. Ullah
Attorney, Agent, or Firm—Dennis E. Kovach; Herbert G. Burkard

[57] ABSTRACT

A distribution optical fiber network includes a light source having a mode volume less than a distribution optical fiber, the light source being connected to the fiber so as to minimize the number and order of modes initially supported by the fiber by aligning an optical center of the light source with a geometric center of the fiber.

17 Claims, 6 Drawing Sheets

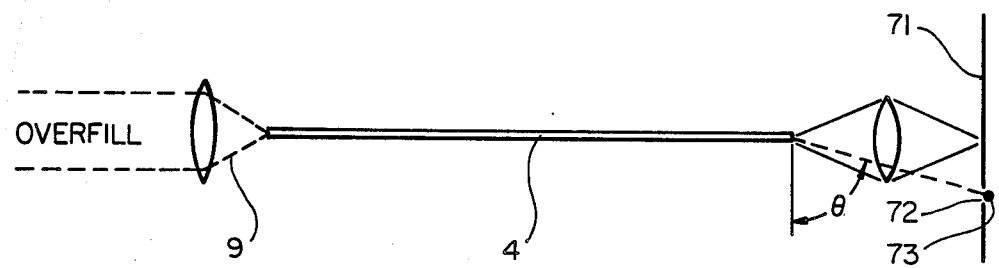
*FIG_1*
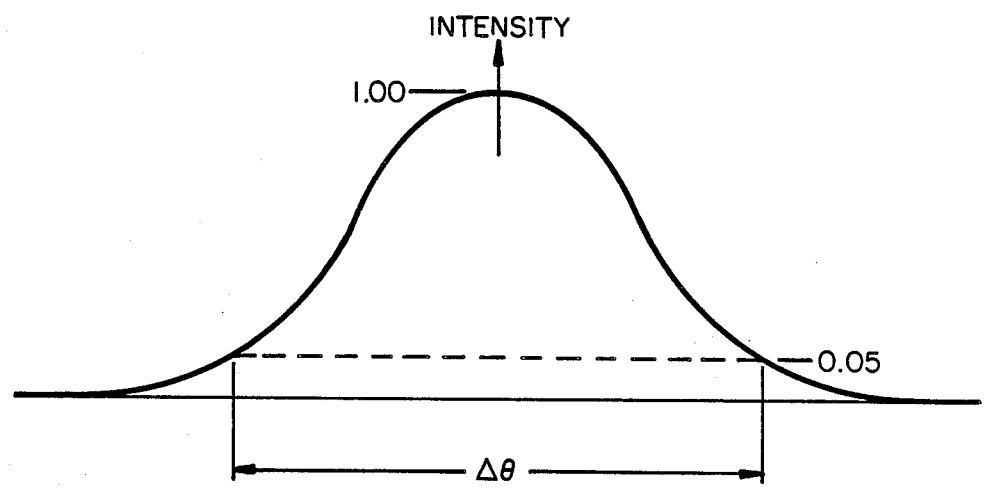
*FIG_2*

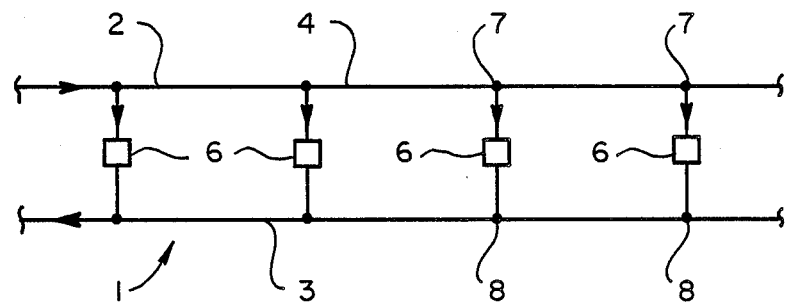
FIG_3
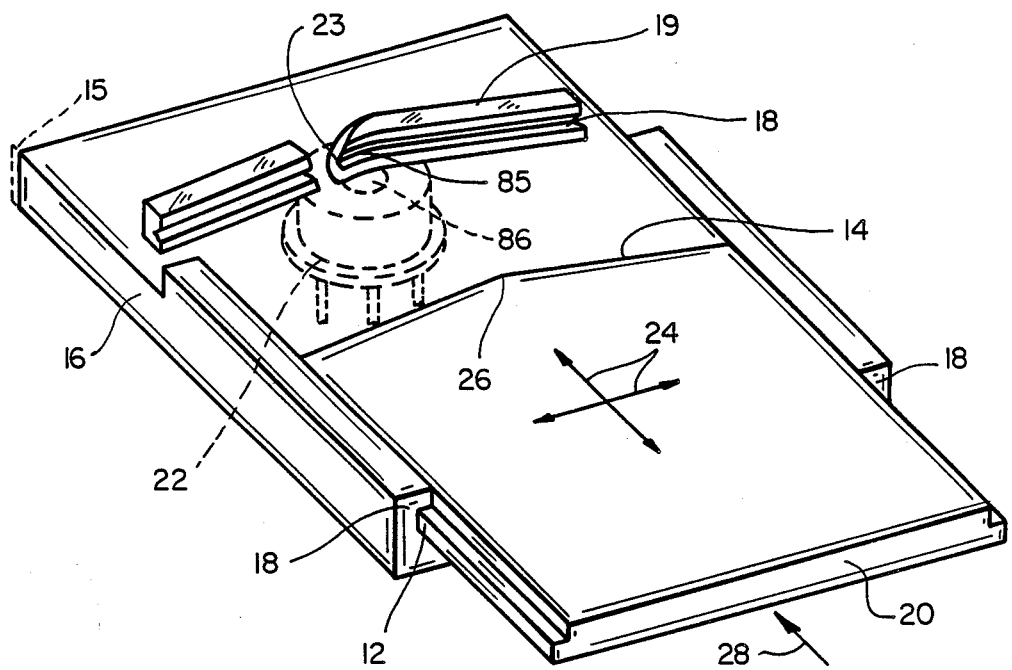
FIG_4

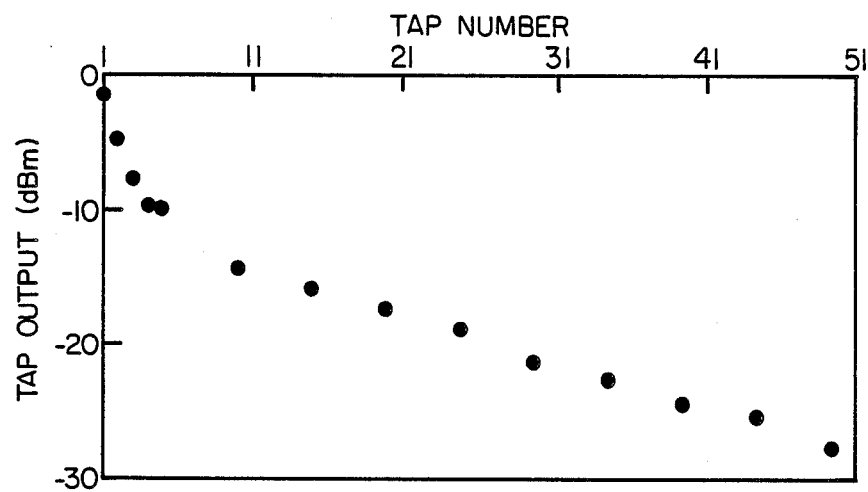
FIG_5
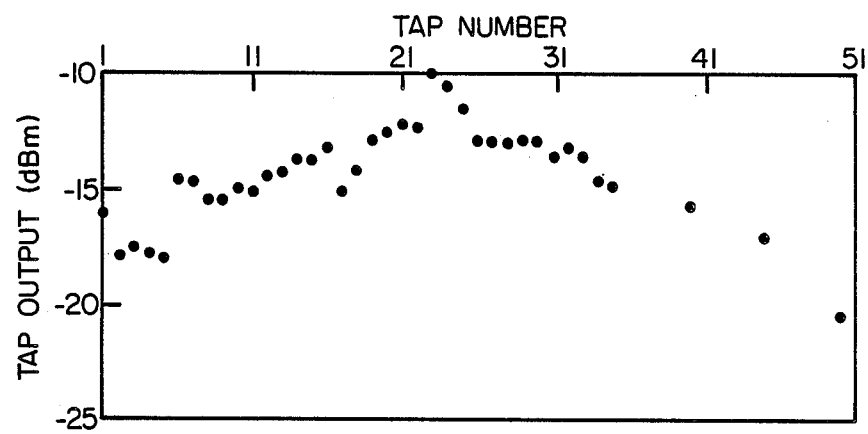
FIG_6

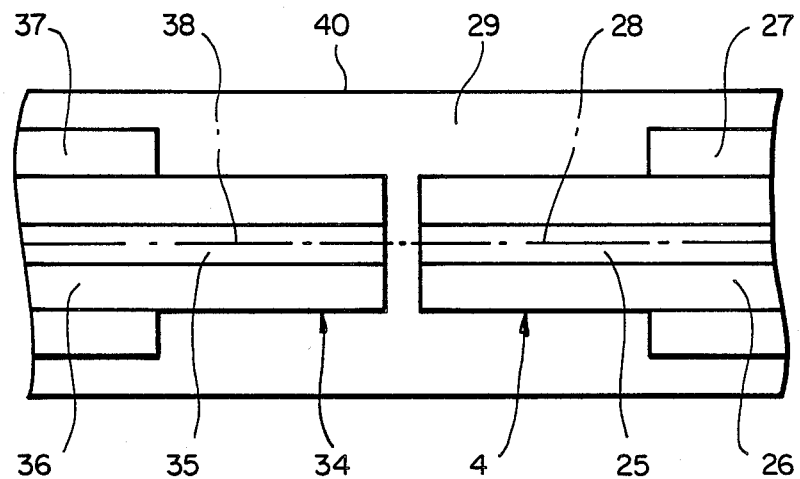
FIG_7
(PRIOR ART)
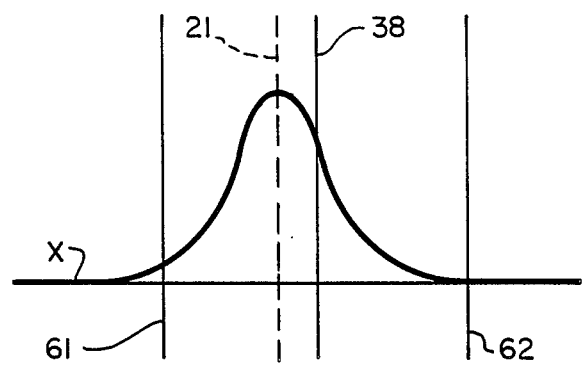
FIG_8

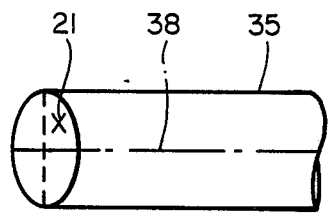
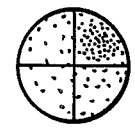
FIG_9a  FIG_9b
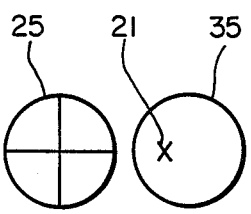
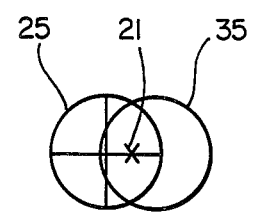
FIG_10a  FIG_10b
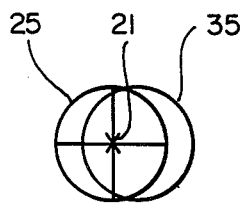
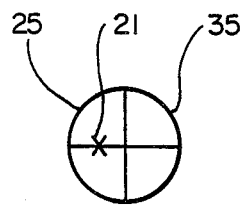
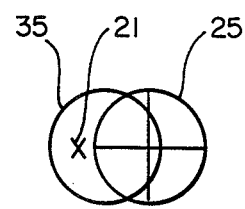
FIG_10c  FIG_10d  FIG_10e

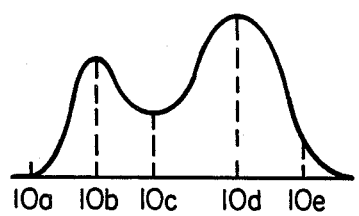
FIG_11
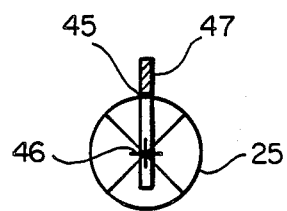
FIG_12
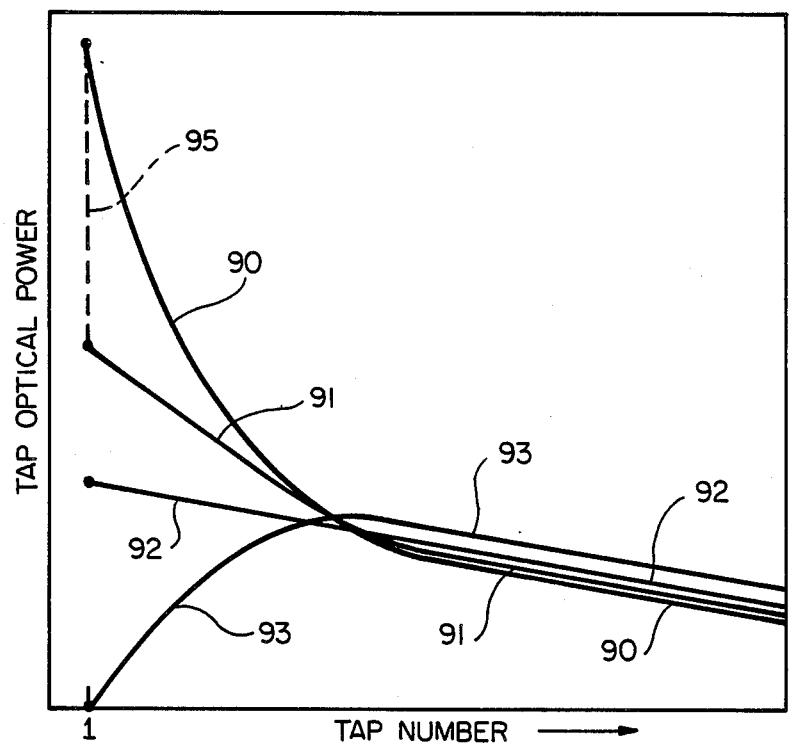
FIG_13

BUS OPTICAL FIBER INCLUDING LOW MODE VOLUME LIGHT SOURCE OPTIMALLY ALIGNED

BACKGROUND OF THE INVENTION

The present invention relates to improved methods and apparatuses for distributing information using an optical fiber, and in particular to optimum ways of injecting optical signals into fiber distribution networks.

Numerous methods have been proposed in the prior art for distributing information using an optical fiber. A major obstacle to be overcome by any distribution architecture which utilizes non-point-to-point connections is the provision of sufficient optical power so that a sufficiently large number of drops or terminal connections can be made therefrom so that the cost per connection or drop of the architecture can be kept sufficiently small so as to be cost effective with competing electrical systems.

SUMMARY OF THE INVENTION

It is an object of the present invention to provide an apparatus and method whereby network optical power is conserved in a more efficient manner than heretofore has been done so as to increase a number of possible drops or connections for a distributed architecture.

It is a further object of the present invention to provide a method and apparatus whereby a dynamic range of a plurality of read taps disposed in series on an optical fiber is substantially reduced.

It is yet a further object of the present invention to provide an apparatus and method whereby detectable optical signal power levels can be extracted from an optical fiber in a serial manner when an overall power level within an optical fiber is relatively small.

These and other objects are achieved by a method and apparatus which utilizes a bus optical fiber, a plurality of side taps disposed on the bus optical fiber, and a light source connected to the optical fiber, and preferably one or more connections disposed along the optical fiber, the invention being particularly directed to optimum methods of connecting the light source to the optical fiber and optimum ways of making the various connections, the invention including various means and methods for optimizing a light mode distribution in an optical fiber.

The invention will be described in greater detail by reference to the following drawings.

DESCRIPTION OF THE DRAWINGS

FIGS. 1 and 2 illustrate an apparatus for making an optical fiber near field measurements and results thereof;

FIG. 3 illustrates an optical fiber distribution network;

FIG. 4 illustrates a tap useful in the network of FIG. 3;

FIG. 5 illustrates a graph showing detected power levels of sequential taps in an overfilled network such as that shown in FIG. 3;

FIG. 6 illustrates a graph showing detected power levels of sequential taps of a network according to the present invention;

FIG. 7 illustrates a prior art method of aligning ends of first and second optical fibers;

FIG. 8 illustrates a typical power distribution across a diameter of a fiber in a case where the power is not uniformly distributed across a cross-sectional area of the fiber;

FIGS. 9a and 9b are a perspective view and graphic view, respectively, of a fiber having a non-uniform power distribution across its cross-sectional area;

FIGS. 10a–10e show various stages of aligning ends of first and second fibers;

FIG. 11 illustrates a plot of power intensity detected by a side tap as a function of the extent ends of first and second fibers are overlapped;

FIG. 12 illustrates a stripe laser power profile optimally aligned to a bus optical fiber according to the invention; and FIG. 13 illustrates, for several different buses, optical powers detected by sequential taps on the bus.

DESCRIPTION OF THE PREFERRED EMBODIMENTS

The invention comprises means and methods for optimizing a distribution of light modes within a multimode optical fiber to be used in a distribution manner for information transfer purposes.

Optical fibers are broadly classified into two types, the first being single mode and the second being multimode. Whereas single mode fiber only supports a single mode, referred to as the fundamental mode at its design light propagation frequencies, multimode fiber supports a plurality of modes, generally of the order of 1,000 or so. The modes forming the smallest angles with the center longitudinal axis of the multimode fiber are commonly referred to as lowest order modes or innermost modes, with the modes which form the larger and largest angles respectively with the center longitudinal axis being commonly referred to as larger or outer modes and largest or outermost modes, respectively. Multimode fiber can be either graded or step indexed, and can include a core and cladding which are made of glass, polymers, or combinations thereof, graded index glass core and cladding fibers being preferred due to lower attenuations and increased bandwidths.

In optical fiber transmission systems, 111 the modes the fibers are capable of supporting are initially fully populated as opposed to only the inner or outer modes since this results in maximum light transfer through the optical fiber. When the modes of a fiber are initially fully populated or even over or under populated, as the light propagates through the optical fiber, redistribution occurs between the various modes until an equilibrium distribution is obtained. There are various ways of observing the characteristics of this equilibrium distribution, a near field method being by observing an intensity of an illuminated spot size at a remote end of the fiber, a far field method being by scanning a light intensity at a significant distance away from the remote end of the fiber. A near field measurement yields a radiation pattern from which can be obtained the relative population intensity of the various fiber modes.

FIG. 1 illustrates a typical arrangement for measuring a near field radiation pattern for an optical fiber 4 which is over filled with light 9. A mask 71 having an aperture 72 is scanned over a wide range of positions at the magnified image plane, and an optical intensity at each point 73 behind the mask aperture 72 is measured and plotted as a normalized function, as illustrated in FIG. 2.

Conventionally, when a light source is connected to a multimode optical fiber, a multimode light source is chosen and connected to the fiber so as to initially fully populate or overpopulate all the modes therein. This achieves maximum light injection efficiency and maximum light transmission through the fiber.

It has surprisingly been discovered that new and unexpected advantages can be obtained in distributed networks by choosing a light source and connecting it to the fiber so as to not seemingly achieve maximum light throughput in the fiber and so as to not initially fully populate or overpopulate all fiber modes. According to one aspect of the invention, a low mode volume light source is connected to the multimode optical fiber 4, and the connection is made in such a manner so as to skew the mode distribution within the fiber towards the lower ordered modes. In other words, the fiber mode distribution is initially shifted toward the lower order modes as compared to that which normally exists in equilibrium in the fiber such that the lower ordered modes are more populated and the higher order modes are less populated than exists in equilibrium. The invention is most suitable for use in distribution networks such as those disclosed in U.S. patent application Ser. No. 754,035 filed July 11, 1985 now U.S. Pat. No. 4,768,854 the disclosure of which is incorporated herein by reference.

More specifically, the invention is most suitable for use in networks which include a plurality of macrobends for non-invasively withdrawing light from an optical fiber in a serial manner, a macrobend being a bend having a radius of curvature greater than about 1.5 mm and an amplitude greater than the fiber cladding diameter. Taps, read or write, utilizing macrobends are disclosed in U.S. Pat. No. 4,664,732 and U.S patent application Ser. No. 014,890 filed, now U.S. Pat. No. 4,741,585 Feb. 13, 1987, the disclosures of which are incorporated herein by reference.

FIG. 3 illustrates one embodiment of a distributed network which advantageously can incorporate the present invention. Referring to this figure, a plurality of terminals 6 are connected in parallel across first and second buses 2, 3, the bus 2 comprising a read bus, the bus 3 comprising a write bus. The buses and terminals form a network 1 usable for two-way transmission of data or telephony information, and embodiments providing only one-way communication (e.g. cable television reception) are also included within the scope of the invention in which case only the read bus 2 is required. The invention relates to improved ways of injecting light onto these buses. Read taps 7 are disposed in series on the optical fiber 4 and withdraw a small part of an optical signal therefrom for transmission to associated terminals 6 while leaving a remainder of the optical signal to propagate along the optical fiber 4 to other downstream read taps and hence associated terminals 6. The read taps 7 preferably are of the type which withdraw light from a side of an intermediate length of the optical fiber by passing the light through a side of the fiber cladding and preferably its outer coating (e.g. buffer) by utilizing a macrobend and by utilizing an optical coupler which preferably closely index matches an outer surface of the fiber coating and is in optical contact therewith. The optical coupler is located either at the fiber bend or downstream therefrom at a straight fiber section, as desired.

A preferred tap construction is illustrated in FIG. 4 where reference numeral 18 refers to a fiber holder groove, 19 an optical coupler 14 a clamp movable along groove 12 for clamping the fiber 4 (FIG. 1) in the groove 18, 23 a light deflecting surface, and 22 a photodetector. A fiber bend created by a curve 85 in the groove 18 causes some light to radiate form the fiber so as to pass through a side of an intermediate length thereof, with the radiating light being deflected by the surface 23 onto an active area 86 of the photodetector 22.

Write taps 8 have a similar construction except that the photodetector 22 is replaced with a light emitter, e.g. a laser or LED, which generates light which is deflected by the surface 23 and into an optical fiber core by passing through the optical coupler 19, the fiber buffer, the fiber cladding (and possible jackets), though the jackets and buffer may be removed if desired.

EXAMPLE 1

A 2.04 km length of optical fiber having a glass core diameter 100 um, a glass cladding diameter 140 um, and an acrylate buffer diameter 250 um, obtained from Corning under the tradename Corguide, had an upstream first end connected to a high mode volume spectra diode laser light source. 51 taps were disposed on the fiber at 40 m intervals from the light source, and an amount of power detected at various intermittent taps was recorded, the results being set forth in FIG. 5. Each tap was of identical construction and withdrew light through a side of the fiber at a bend having a radius 0.152" and a sector angle 45°, the light passing through a side of the fiber cladding and buffer. As FIG. 5 shows, successive taps detect successively less power, and a difference between the amount of power detected by the first and last taps represents a relatively large dynamic range (about 26 dB for 51 taps).

EXAMPLE 2

The light source of Example 1 was replaced with a single mode light source, specifically a General Optronics Single Mode Laser, which was connected to the fiber with the taps removed therefrom so as to result in maximum light transmission through the fiber. Thereafter, the taps of Example 1 were reattached to the fiber, and the power detected by each tap was measured and recorded, the results being shown in FIG. 6. The dynamic range decreased to about 10 dB.

As FIGS. 5 and 6 illustrate, replacing the multimode high mode volume light source of Example 1 with the low volume mode source of Example 2 results in reducing the dynamic range of the bus network by about 16 dB for 51 taps. As FIG. 6 shows, the first several taps immediately downstream from the low mode volume source detect relatively low amounts of power due to the scarcity of higher order modes initially contained within the optical fiber. Since the first several taps bend the fiber, this causes a certain amount of accelerated mode coupling within the fiber which generates higher order modes for further downstream taps which results in these further downstream taps detecting higher amounts of light than the initial taps. Subsequently, after twenty or so taps the overall power level within the optical fiber is reduced by the attenuation of each of these taps and the mode volume distribution within the fiber tends to stabilize to that equilibrium distribution for the fiber with a plurality of taps thereon. Hence the amount of power detected by successive taps begins to fall off rather gradually along a slope similar to that found to exist in the case of remote taps on a bus utilizing a multimode source after tap induced equilibrium is established (Example 1). In other words, the initial low power levels detected by the first several taps is followed by a gradual increase and then a gradual decrease in detected power at subsequent taps. Therefore it is readily evident that the dynamic range of the system, e.g. the difference in power detected by the brightest and dimmest tap, is much lower for the case where a low mode volume distribution is injected into the optical fiber as opposed to a high mode volume distribution. In fact, experiments indicate that the level of improvement is typically greater than 3 dB, preferably greater than 6 dB, 10 dB, 13 dB, 16 dB, 20 dB, and 30 dB, the precise improvement being dependent on a number of factors, such as the type of fiber used, the number of taps used, an insertion loss of each tap, etc.

The advantages of the invention are even more readily appreciated by reference to FIG. 13 wherein optical powers detected by sequential taps on a bus are illustrated as a function of tap number for several different initial light mode distributions injected into the bus fiber. If a multimode bus optical fiber is initially overfilled with light or optical power, a curve 90 is obtained when a plurality of taps are disposed thereon. As can be seen, the first several taps disposed on the optical fiber cause the optical power in the bus to rapidly decline since these taps readily strip the abundant outermost modes contained within the fiber, and then at some point, such as the 20 or 30th tap or so, the decline in bus optical power levels off to nearly a constant value since the first 20 or 30 taps or so has stripped off sufficient outermost modes to yield what is known as a tap induced equilibrium modal distribution in the fiber. In other words, after the 20 or 30th tap or so, regardless of the modal distribution modal distribution injected into the fiber, the taps generate sufficient mode coupling and mode stripping so that a mode equilibrium distribution is reached which is typical for a fiber, tap construction, and tap location geometry for the bus.

At the other extreme, when a single mode light source is optimally connected to the optical fiber so as to inject the lowest possible modes into the fiber, a curve such as 93 is obtained whereat the first several taps, say 20 to 30, progressively detect increasing amounts of light while initially detecting very little. In many situations, the curve 93 may not be ideal because the first several taps may be too dim, in which case an optimum solution would be to initially inject a modal distribution into the fiber so as to achieve curves such as that illustrated by reference numerals 91 or 92 which can be obtained using either single or multimode sources. The curve 92 represents a bus wherein an initial distribution of light modes exactly equals the tap induced equilibrium distribution so that all the taps, including the very first few add the last few, create essentially the same amount of attenuation to the signal in the optical fiber, with curve 91 illustrating a case where the fiber is only slightly overfilled with light. The dotted line 95 represents a difference between an amount of attenuation created to the bus by the first tap on the bus when the invention is used as opposed to overfilling the fiber, as is done in the prior art. The difference 95 preferably can exceed 3 dB, 6 dB, or 10 dB, the optimum amount being dependent on the amount of power initially available for injection and an amount of power tapable by the various taps.

Improvements are also obtained if a light source is optimally connected to the bus optical fiber subsequent rather than prior to attaching the taps 7. In particular, FIG. 7 illustrates a connection between a bus multimode fiber 4 having a core 25, a cladding 26, and a buffer 27 which has been aligned with a pigtail optical fiber 34 having a core 35, a cladding 36, and a buffer 37, the pigtail optical fiber being connected to the light source, the fibers being glued together by adhesive 29 contained within a tube 30. Care is taken in such connections to insure that the light active area of the fiber 34, e.g. its core 35, is geometrically centered with the light active area of the fiber 4, e.g. its core 25, as illustrated by the colinearity of the center axis 38, 28 of these fiber cores. This geometry results in maximum light throughput in the fiber 4 even if the claddings 26, 36 of these fibers are misaligned due to eccentricity differences of the cores within their claddings. The same alignment geometry is used in fusion connections and other mechanical connections as well.

However, it has surprisingly been discovered that unconventional alignment methods are optimal when the distribution optical fiber for the bus comprises a multimode optical fiber and when a plurality of read taps 7 or write taps 8 are disposed thereon, so as to induce bends to the fiber, especially macrobends but also including microbends (bends having amplitudes less than the cladding diameter), especially when a light power distribution across the light active area 35 of the connecting fiber or source 34 is not centered on its geometric center 38, e.g. the light source is astigmatic. In particular, assume the fiber 34 has an off-center light distribution as illustrated in FIG. 8 wherein the X axis is representative of points across a diameter of the fiber, the Y axis is representative of an optical power lever at points across the diameter of the fiber, and lines 61, 62 illustrate opposite core-cladding boundaries. Line 38 is the center of the core.

As can be appreciated from FIG. 8, a center of light intensity of the fiber 34 is offset from the center line 38 of the optical fiber core 35. Hence, aligning the center line 38 of the fiber core 35 with the center line 28 of the fiber core 25 results in the center of light intensity 21 (indicated by an "X" in FIGS. 7 and 8) injected into the core 25 being offset from its center line 28, as illustrated in the perspective view of FIG. 9a and the graph of FIG. 9b. Such light coupling between the fibers 4, 34 results in significant over population of outer ordered modes relative to lower order modes in the optical fiber 4, as compared to a configuration where the center of light intensity 21 coincides with the core center line 28, and especially when compared to an equilibrium distribution for the fiber, and most especially when compared to an equilibrium distribution for the fiber when connected to a plurality of taps in series at a point downstream therefrom.

In a long line or point-to-point optical fiber connection, such over population is not detrimental to light transmission since the modes repopulate and redistribute over time and distance. In fact, exact geometric alignment has conventionally been deemed to be the most advantageous connection since it has been determined that total minimum attenuation at the connection point and downstream therefrom results, the total attenuation including that attributable to the fiber itself and that attributable to the connection, even when the light source is astigmatic. However, in a distribution architecture such as that illustrated in FIG. 3 which utilizes the taps 7 or the taps 8, macrobends in the first several taps downstream from the connection strip an undue proportion of the light out of the fiber since the taps are highly efficient at withdrawing outer modes as opposed to inner modes and hence the taps induce an unduly large tap insertion loss to the bus 2 or bus 7. Since this tapped power is not thereafter available to be redistribute in the fiber, the result is that the intensity of light in the fiber downstream of all the taps is less than the case where geometric misalignment is utilized to create an average lower mode volume.

Accordingly, another aspect of the invention comprises connecting a light source to a multimode optical fiber so as to fully populate to the extent possible lower ordered modes as opposed to higher ordered modes.

EXAMPLE 3

An optical fiber having a core diameter of 100 um, a cladding diameter of 140 um, and a buffer diameter of 250 um, the core and cladding being made of glass and the buffer being made of an acrylate, obtained from Corning under the tradename Corguide, had an upstream first end connected to a Liconix laser transmitter, and a light emitting surface of the transmitter was moved relative to the first end of the optical fiber core while monitoring light throughput from a second downstream opposite end of the optical fiber until the light emitted from the second fiber end was maximized. In this state, the geometric center of the light emitting surface of the light source was approximately coincident with the geometric center of the first optical fiber end and the light detected at the second fiber end was +0.39 dBm. Thereafter, a plurality of read taps 7 each of which withdrew light from a side of the optical fiber at a bend by passing the light through the fiber cladding and buffer were sequentially disposed on the optical fiber at 40 meter intervals. Then, the amount of light emitted from the second optical fiber end was measured and was found to be −7.5 dBm. Next, the light emitting surface of the transmitter was moved relative to the first optical fiber end so as to misalign the geometric centers thereof while monitoring the light output at the second optical fiber end, and it was found that the light emitted from the second optical fiber end could be increased to −3.5 dBm by substantially misaligning these geometric centers. Next, all of the read taps 7 were removed from the optical fiber, and the light emitted from the second optical fiber end was measured to be −1.5 dBm.

As Example 3 illustrates, it has been surprisingly and unexpectedly discovered that optimally aligning geometric centers of a light emitting surface of a light transmitter with the geometric surface of an optical fiber end so as to achieve optimum light throughput at an opposite second optical fiber end is disadvantageous where the fiber is to be used in a distribution system with a plurality of side taps 7 or 8 which induce a plurality of bends to the fiber, especially macrobends.

The invention can be better understood by reference to FIGS. 8 and 10a–10e, the latter figures showing various possible alignments between the fiber cores 25, 35, light being transferred from the core 35 into the core 25, with an integrated average center of light intensity of the core 25 being indicated by point 21, which is illustrated as being off geometric center 38. FIG. 11 shows a detected light intensity using a side tap 7 immediately downstream from the alignment positions shown in FIG. 10.

Referring to these figures, as fiber cores 35, 25 are moved towards each other so as to overlap from the position 10a to 10b, it is seen from FIG. 11 that a maximum light intensity is detected at point 10b by a relatively close downstream tap 7 since in the position of FIG. 10b an abundance of outermost modes are injected into the fiber core 35, these modes being most efficiently detected by the tap 7. When the fiber cores are moved to the position of FIG. 10c whereat a center of light intensity 21 coincides with a geometric center of the core 39, an intermediate minimum light intensity 10c is detected by the tap 7 since a larger fraction of light transfer between the cores 35, 25 creates a lower average mode order in the fiber 25, lower order modes being less susceptible to side detection techniques. The intermediate minimum intensity results even through the overall amount of light in the core 25 for the case of FIG. 10c is greater than that of the case of FIG. 10b. FIG. 10d illustrates the situation where optimum geometric alignment is achieved, and FIG. 9 illustrates that a second higher maximum light intensity 10d is detected by the tap 7 since in this case the light intensity in the fiber core 25 is a maximum, and the average mode volume order is also rather high. Further moving the fiber cores 35, 25, relative to each other as illustrated in FIG. 10e results in a rapid decrease in the amount of light detected by the tap 7, as illustrated by FIG. 11.

Accordingly, though the configuration of FIG. 10d is conventionally used for optical fiber connections, whether the connection be between optical fibers, or between a downstream optical fiber and a light emitter such as a LED or laser, for purposes of a bus architecture illustrated in FIG. 3, overall less attenuation is achieved if an alignment such as that illustrated in FIG. 10c is utilized so as to create an overall average lower order mode distribution. Example 3 confirms these advantages.

It is important to note that the invention is useful for a write bus as well as a read bus. Specifically in a write bus, a "first" write tap injects a first optical signal into a fiber, and this first optical signal must pass through a plurality of macrobends caused by a like plurality of additional downstream write taps, and hence any astigmatism of the output of the first write tap which causes an overpopulation of outer modes relative to inner modes as compared to an ideal write tap having no astigmatism will create excessive attenuation to the first optical signal. The invention is also applicable to a bus having both read and write taps thereon, as in a network using drop-insert taps.

Though this aspect of the invention has been described by way of illustration of a connection between two optical fiber cores, it is readily evident that the invention is applicable to aligning any type of light source with a bus optical fiber, with FIG. 12 illustrating a situation where a laser stripe 45 having a center of illumination point 46 is geometrically misaligned with a fiber core 25 so as to align the point 46 with a center of the core 25. Such an alignment geometry results in overall lower attenuation in the bus 2 when a plurality of taps 7 are utilized even though it is readily evident that some of the light 47 of the laser stripe 45 will not be captured by the core 25. However, as can be appreciated, this is not detrimental in the bus network since the light 47 would have created predominantly outermost modes in fiber core 39 which would readily be attenuated by the closest upstream tap or taps and hence not be available for downstream taps anyway.

The invention of aligning an optical center of a low mode volume light source with a geometric center of a bus optical fiber has an advantage in addition to that described above of reducing an overall attenuation in the bus. Specifically, by aligning as described, the first several taps downstream from the connection will detect a lower power intensity than they would if geometric centers were aligned at the connection. Since the light intensity of the bus optical fiber is a maximum just downstream from a light source, the taps 7 closest thereto are "brightest", and hence a difference between the amount of power these taps detect and that detected by taps near the end of the bus where the bus is dimmest represents a dynamic range of the taps 7. If uniform system components are specified for the bus and if geometric alignment is used at connections, it is readily evident that optical receivers having a rather large dynamic range would be required. However, with the invention, since the amount of light withdrawn by the taps 7 closest to the light source is reduced by aligning an optical center with a geometric center as described, the "brightest" taps are reduced in intensity which lowers the value of the dynamic range of all the taps 7.

Though the invention has been described by reference to several specific embodiments, it is to be understood that the invention is not to be limited thereby and is to be only limited by the appended claims.

What is claimed is:

1. A distribution optical fiber network, comprising:
   a multimode optical fiber;
   N side taps disposed serially on the fiber, N being an integer greater than 1;
   means for injecting an optical signal into the fiber such that an initial distribution of light modes supported by the fiber from light emitted by the injecting means is lower than an equilibrium light mode distribution for the fiber.

2. The network of claim 1, the initial distribution of light modes being such that an attenuation induced to the optical signal by a first one of the N taps closest to the injecting means is at least 3 dB lower than it would be if the equilibrium light mode distribution existed within the fiber.

3. The network of claim 2, the attenuation being at least 6 dB lower.

4. The network of claim 2, the attenuation being at least 10 dB lower.

5. The network of claim 1, the initial distribution being lower than a tap induced equilibrium light mode distribution for the fiber as measured at a point downstream from all the N taps.

6. The network of claim 1, the initial distribution of light modes being such that a desired attenuation induced to the optical signal by a first one of the N taps closest to the injecting means is less than one of first and second interim maximum attenuations obtained when the injecting means is moved in opposite directions from a point where the desired attenuation is induced.

7. The network of claim 6, the first one of the N taps comprising a read tap which withdraws light through a side of the fiber at a macrobend bend.

8. The network of claim 1, the N taps comprising read taps which withdraw light from the optical fiber by passing the light through a side of the fiber at a bend.

9. The network of claim 6, the N taps comprising write taps which inject individual optical signals into the optical fiber by passing the light through a side of the fiber at a fiber bend.

10. The network of claim 1, the optical fiber comprising a graded index optical fiber having a glass core and cladding, the fiber having a polymeric coating therearound.

11. The network of claim 1, the light source comprising a laser or light emitting diode.

12. The network of claim 1, the light source comprising a single mode light source.

13. A distribution optical fiber network, comprising:
   a multimode optical fiber;
   N side taps disposed serially on the fiber, N being an integer greater than 1;
   means for injecting an optical signal into the fiber such that a first tap on the fiber closest to the injecting means attenuates the optical signal by an amount which is less than an amount of attenuation which the first tap would induce to the optical signal if the injecting means were oriented relative to the fiber so as to increase a transmission intensity through the fiber if no taps were disposed thereon.

14. A distribution optical fiber network, comprising:
   a multimode optical fiber;
   N side taps disposed serially on the fiber, N being an integer greater than 1;
   means for injecting an optical signal into the fiber such that a first tap on the fiber closest to the injecting means attenuates the optical signal by an amount which is less than an amount of attenuation which the first tap would induce to the optical signal if the injecting means was repeatedly reoriented relative to the fiber at second and third positions on opposite sides of a first position whereat the injecting means is actually oriented.

15. A method of connecting an optical light source to an optical fiber to which is or will be connected a plurality of distributed taps, comprising the steps of:
   connecting an optical light source to an optical fiber so as to inject an optical signal therein;
   monitoring an intensity of the optical signal in the fiber downstream of the light source by withdrawing part of the optical signal from the fiber through a side of the fiber at a bend;
   adjusting a position of the connected optical light source relative to the fiber until a desired magnitude of the withdrawn optical signal part is found, the desired magnitude being less than 1 on first and second interim maximum magnitudes obtained when the optical light source is moved in opposite directions from a position where the desired magnitude is obtained, the desired position being between positions whereat the first and second interim maximum magnitudes are obtained;
   creating a plurality of macrobends in the optical fiber downstream from the optical light source to create sufficiently large cones of acceptance thereat such that a like plurality of optical signals can be injected into or withdrawn from the optical fiber at the plurality of macrobends.

16. The method of claim 15, the light source comprising an astigmatic light source.

17. The method of claim 15, further comprising the steps of:
   making a further connection to the optical fiber;
   monitoring an intensity of the optical signal in the fiber downstream of the connection by withdrawing a further part of the optical signal from the fiber through a side of the fiber at a further bend;
   adjusting a position of the connection relative to the fiber until a further desired magnitude of the withdrawn optical signal part is found, the further desired magnitude being greater than an interim minimum magnitude obtained between first and second interim maximum magnitudes which are obtained when the optical light source is moved in opposite directions from a position whereat the interim minimum magnitude is obtained;

creating at least one further macrobend in the optical fiber downstream from the connection to create at least one cone of acceptance to the fiber such that at least one optical signal can be injected into or withdrawn from the optical fiber downstream from the connection.

* * * * *